(12) United States Patent
Tseng

(10) Patent No.: US 9,582,139 B1
(45) Date of Patent: Feb. 28, 2017

(54) MULTI-LEVEL MOBILE DEVICE PROFILES

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 995 days.

(21) Appl. No.: 13/482,088

(22) Filed: May 29, 2012

Related U.S. Application Data

(60) Provisional application No. 61/490,466, filed on May 26, 2011.

(51) Int. Cl.
*G06F 3/0481* (2013.01)
*G06F 15/173* (2006.01)

(52) U.S. Cl.
CPC ........ *G06F 3/04812* (2013.01); *G06F 15/173* (2013.01); *G09G 2340/145* (2013.01)

(58) Field of Classification Search
CPC .............................. G06F 3/0485; G06F 3/0482
USPC ......................................................... 715/741
See application file for complete search history.

(56) References Cited

U.S. PATENT DOCUMENTS

| | | | | |
|---|---|---|---|---|
| 5,396,264 A * | 3/1995 | Falcone | ................ | G06F 3/0482 340/7.55 |
| 5,821,936 A * | 10/1998 | Shaffer | ............... | H04M 1/2477 715/810 |
| 6,415,224 B1 * | 7/2002 | Wako | ................ | G01C 21/3611 340/903 |
| 6,633,758 B1 * | 10/2003 | Heinonen | ............... | G06F 9/445 455/418 |
| 7,353,465 B2 * | 4/2008 | Callaway et al. | ........... | 705/7.13 |
| 7,925,241 B2 * | 4/2011 | Helvick | ...................... | 455/412.2 |
| 8,301,897 B2 * | 10/2012 | Turner | .......................... | 713/182 |
| 8,332,761 B2 * | 12/2012 | Cox | .................... | H04L 12/1818 715/750 |
| 8,478,306 B2 * | 7/2013 | Zheng | ........................ | 455/456.6 |
| 8,700,631 B2 * | 4/2014 | Weinroth | ...................... | 707/740 |
| 8,718,709 B2 * | 5/2014 | Jang et al. | .................... | 455/558 |

(Continued)

FOREIGN PATENT DOCUMENTS

WO    WO 2008105766 A1 *    9/2008    ............. H04W 4/02

OTHER PUBLICATIONS

Password, Watchword, American Heritage Dictionary, 2011, Houghton Mifflin. Retrieved from http://search.credoreference.com/content/entry/hmdictenglang/password/0 and /watchword/0 on Feb. 24, 2015. 4 pgs.*

(Continued)

*Primary Examiner* — Steven Sax
(74) *Attorney, Agent, or Firm* — Fish & Richardson P.C.

(57) ABSTRACT

A method of configuring a mobile device includes providing for a mobile computing device a plurality of device profiles that each define a manner in which the mobile computing device interacts with a user, operating the mobile computing device using a first profile of the plurality of device profiles, automatically, and without user input, identifying by the mobile computing device that the mobile computing device has changed states, in response to the determining, presenting a user of the mobile computing device with a list of device profiles available to the mobile computing device and a selectable control for selecting one of the profiles in the list, receiving, from the user, an instruction to switch to a second profile of the device profiles in the list that is separate and distinct form the first profile, and configuring the mobile computing device to operate according to the second profile.

19 Claims, 12 Drawing Sheets

(56) References Cited

U.S. PATENT DOCUMENTS

| | | | |
|---|---|---|---|
| 9,148,487 B2* | 9/2015 | Hilburn | H04L 67/303 |
| 2003/0017843 A1* | 1/2003 | Noblins | H04M 3/4228 |
| | | | 455/553.1 |
| 2003/0126330 A1 | 7/2003 | Balasuriya | |
| 2004/0053605 A1* | 3/2004 | Martyn | H04M 1/72586 |
| | | | 455/418 |
| 2004/0064567 A1 | 4/2004 | Doss et al. | |
| 2004/0203768 A1* | 10/2004 | Ylitalo et al. | 455/435.1 |
| 2005/0107114 A1* | 5/2005 | Ocock | H04W 8/183 |
| | | | 455/550.1 |
| 2005/0114493 A1* | 5/2005 | Mandato et al. | 709/223 |
| 2005/0198125 A1* | 9/2005 | Macleod Beck | G06Q 10/107 |
| | | | 709/204 |
| 2005/0221808 A1* | 10/2005 | Karlsson | H04M 1/72563 |
| | | | 455/418 |
| 2006/0030302 A1* | 2/2006 | Andrew et al. | 455/414.1 |
| 2006/0085748 A1 | 4/2006 | Luther et al. | |
| 2006/0179410 A1 | 8/2006 | Deeds | |
| 2009/0070412 A1* | 3/2009 | D'Angelo | G06Q 10/10 |
| | | | 709/203 |
| 2009/0125911 A1* | 5/2009 | Lazarus | 718/104 |
| 2009/0132197 A1* | 5/2009 | Rubin et al. | 702/141 |
| 2009/0170552 A1* | 7/2009 | Lin | 455/550.1 |
| 2009/0253455 A1* | 10/2009 | Huang | 455/550.1 |
| 2009/0307616 A1* | 12/2009 | Nielsen | 715/764 |
| 2010/0319053 A1* | 12/2010 | Gharabally | 726/4 |
| 2011/0053574 A1* | 3/2011 | Rice | H04M 1/006 |
| | | | 455/418 |
| 2011/0118908 A1* | 5/2011 | Boorman et al. | 701/14 |
| 2011/0137929 A1* | 6/2011 | Lehmann | G06Q 10/109 |
| | | | 707/769 |
| 2011/0190595 A1* | 8/2011 | Bennett | A61B 1/00016 |
| | | | 600/301 |

OTHER PUBLICATIONS

Definitions: device, graphical user interface, icon, logon, logon script, profile, user agent, and user profile; Microsoft Computer Dictionary, Mar. 15, 2002, Microsoft Press, Print ISBN-13:978-0-7356-1495-6, pp. 196, 302, 334, 403, 532, 684, 685.*

* cited by examiner

1500

```
┌─────────────────────────────────┐
│ Enable a mobile device to access a first │
│ profile and a second profile for the     │
│ mobile device          1510              │
└─────────────────────────────────┘
                 │
                 ▼
┌─────────────────────────────────┐
│ Receive an instruction to load the first │
│ profile to the mobile device             │
│                        1520              │
└─────────────────────────────────┘
                 │
                 ▼
┌─────────────────────────────────┐
│ Configure the mobile device using the    │
│ first profile so that a user perceives the│
│ mobile device using a first configuration│
│                        1530              │
└─────────────────────────────────┘
                 │
                 ▼
┌─────────────────────────────────┐
│ Present to the user on the mobile device │
│ a selectable control structured and      │
│ arranged to enable the user to switch    │
│ from the first profile to the second profile│
│                        1540              │
└─────────────────────────────────┘
                 │
                 ▼
┌─────────────────────────────────┐
│ Receive, from the user, a selectable     │
│ instruction to switch from the first profile│
│ to the second profile  1550              │
└─────────────────────────────────┘
                 │
                 ▼
┌─────────────────────────────────┐
│ Configure the mobile device using the    │
│ second profile so that the user perceives│
│ the mobile device using a second         │
│ configuration for the second profile that│
│ is separate and distinct from the first  │
│ configuration associated with the first  │
│ profile                1560              │
└─────────────────────────────────┘
```

MULTI-LEVEL MOBILE DEVICE PROFILES

CROSS-REFERENCE TO RELATED APPLICATION

This application claims priority to U.S. Provisional Application Ser. No. 61/490,466, filed on May 26, 2011, entitled "Multi-Level Mobile Device Profiles," the entire contents of which are hereby incorporated by reference.

TECHNICAL FIELD

This document generally relates to mobile computing devices such as smartphones, and laptop and tablet computers.

BACKGROUND

People spend hours at a time with their electronic devices—computers, telephones, music players, and the like. People may prefer devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, 4-directional keypads (DPads), and other such input mechanisms.

Various mechanisms can be used to customize a mobile device, such as a smartphone, for a particular user or a particular situation. For example, a user may select a wallpaper to be displayed as a background for his or her telephone. Similarly, a user can select a theme that affects the look of icons on the device, colors for objects displayed on the device, and sounds that are played by the device upon the occurrence of certain events.

SUMMARY

This document describes systems and techniques by which a user of a computing device, such as a smartphone, can conveniently change an active profile on his or her computing device. In some examples, a computing device may monitor one or more conditions to determine whether the context or state for the device has changed. For example, a device may determine that it has been moved from a user's home to the user's workplace. The device may then prompt its user, asking the user whether he or she would like to switch to a work-focused profile. Such a profile may, for example, eliminate game-related icons from a desktop of an operating system, and may switch the user to a work-related email account, among other things. The device may also provide simple mechanisms by which a user may surface a profile-changing application. For example, the device may show a list of available profiles and may allow a user to quickly toggle through the list and then select one of the profiles (e.g., using a scroll wheel or other scrolling input mechanism).

In one implementation, a method of configuring a mobile device is disclosed. The method comprises providing for a mobile computing device a plurality of device profiles that each define a manner in which the mobile computing device interacts with a user; operating the mobile computing device using a first profile of the plurality of device profiles; automatically, and without user input, identifying by the mobile computing device that the mobile computing device has changed states; in response to the determining, presenting a user of the mobile computing device with a list of device profiles available to the mobile computing device and a selectable control for selecting one of the profiles in the list; receiving, from the user, an instruction to switch to a second profile of the device profiles in the list that is separate and distinct form the first profile; and configuring the mobile computing device to operate according to the second profile. The first profile can be associated with a first online identity for the user that is different than a second online identity that is associated with the second profile. Alternatively, the first profile can be associated with a first contact address for the first online identity and the second profile is associated with a second contact address for the second online identity. Also, the first profile can represent a first level of security for a first online identity and the second profile represents a second level of security for the first online identity, wherein the second level of security is configured to readily display excerpts of content associated with the first online identity.

In certain aspects, the first profile represents a first level of security of security for a first online identity and the second profile represents a second level of security for the first online identity, wherein the second level of security is configured to display excerpts of content associated with the first online identity. Also, presenting to the user the selectable control can include displaying a highlight on a first of the profiles in the list, the movable highlight being scrollable through the list for the user to select other profiles in the list. Moreover, presenting to the user the selectable control can include enabling the user to select a mechanical control peripheral to a display in the mobile device to switch between the first profile and the second profile. In addition, operating the mobile computing device using the first profile can include configuring the mobile computing device to use a default profile as the first profile in response to performing a power up sequence on the mobile computing device, wherein the default profile does not reflect any personalization for the user.

In yet other aspects, operating the mobile computing device using the first profile includes configuring the mobile device to automatically use the first profile in response to performing a power up sequence on the mobile device, wherein the first profile is configured to reflect at least some user preferences in a home screen of the mobile device but fewer user preferences than are displayed using the second profile. The method can also include challenging the user for authentication information as a result of receiving the instruction to switch from the first profile to the second profile. Also, configuring the mobile computing device to operate according to the second profile can include making available to the user different applications than are made available with the first profile. Moreover, operating the mobile computing device using the first profile can include presenting a first application in a first configuration and presenting a second application in a second configuration, wherein the first application and the second application are configured to support the same online identity. The method can also comprises detecting a current time for the mobile computing device; determining that the current time for the mobile computing device is associated with the second profile; and presenting the selectable control in response to determining that the local time indicates that the selectable control should be presented in order to use the second profile.

In another implementation, one or more recordable media are disclosed that have recorded thereon instructions that, when executed, perform operations that comprise providing for a mobile computing device a plurality of device profiles that each define a manner in which the mobile computing device interacts with a user; operating the mobile computing device using a first profile of the plurality of device profiles; automatically, and without user input, identifying by the mobile computing device that the mobile computing device has changed states; in response to the determining, presenting a user of the mobile computing device with a list of device profiles available to the mobile computing device and a selectable control for selecting one of the profiles in the list; receiving, from the user, an instruction to switch to a second profile of the device profiles in the list that is separate and distinct form the first profile; and configuring the mobile computing device to operate according to the second profile. The first profile can be associated with a first online identity for the user that is different than a second online identity that is associated with the second profile, or the first profile can be associated with a first contact address for the first online identity and the second profile is associated with a second contact address for the second online identity. Also, the first profile can represent a first level of security for a first online identity and the second profile represents a second level of security for the first online identity, wherein the second level of security is configured to readily display excerpts of content associated with the first online identity.

In certain aspects, the first profile represents a first level of security of security for a first online identity and the second profile represents a second level of security for the first online identity, wherein the second level of security is configured to display excerpts of content associated with the first online identity. Also, presenting to the user the selectable control can include displaying a highlight on a first of the profiles in the list, the movable highlight being scrollable through the list for the user to select other profiles in the list, and can include enabling the user to select a mechanical control peripheral to a display in the mobile device to switch between the first profile and the second profile. Moreover, configuring the mobile computing device to operate according to the second profile can include making available to the user different applications than are made available with the first profile.

In other aspects, the operations can further comprise detecting a current time for the mobile computing device; determining that the current time for the mobile computing device is associated with the second profile; and presenting the selectable control in response to determining that the local time indicates that the selectable control should be presented in order to use the second profile.

The details of one or more embodiments are set forth in the accompanying drawings and the description below. Other features, objects, and advantages will be apparent from the description and drawings, and from the claims.

DESCRIPTION OF DRAWINGS

FIG. 15 is a flow chart of a process by which a mobile device is configured to reflect the use of a different profile.

Like reference symbols in the various drawings indicate like elements.

DETAILED DESCRIPTION

Figure 1A:
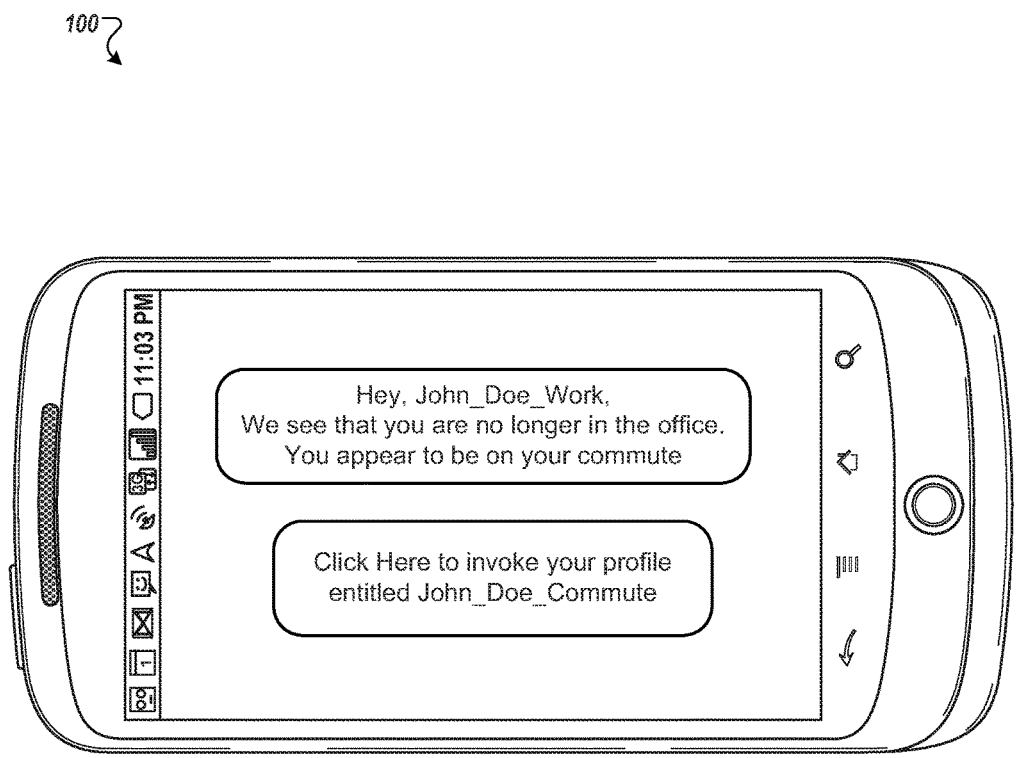
FIG. 1A illustrates a mobile device with an example of a display that enables a user to select a profile that is different than the device's current profile.

Users increasingly rely on mobile devices as gateways to information, and in various parts of their lives. For instance, a mobile device may serve as a messaging tool for working professionals, a navigational tool for difficult commutes, and as an entertainment tool for communicating with friends and others in a social network. A user would prefer to use a single device to perform these diverse tasks. However, the desire to interface with a single device is balanced with a user's interest in compartmentalizing the different roles for which a user may employ a mobile device. Oftentimes, these different roles can spill over into how a user configures his or her mobile device. A user may be a fervent and vocal booster for a local sports team and use team-oriented applications, web sites, and messaging addresses as a sports enthusiast. A user may not wish to share that sports enthusiasm for a particular sports team with co-workers. For example, the user may wish to shield co-workers from knowing that the user is a well-regarded blogger about the local sports team. Such an inadvertent disclosure may come about as a result of co-workers seeing the user's mobile device.

The look and feel of a computing device is generally controlled by a profile that is set on the device. A profile sets a plurality of user interface parameters that affect user interaction with a device in a unified manner and across multiple applications. For example, one profile may cause certain applications to be presented to a user—such as recreational applications—and may also control sounds, wallpaper, and colors for the device. Another profile may cause the recreational applications to be hidden and business-related applications to be presented, along with different sounds, icons, colors, and other such components.

A mobile device may be configured to use different profiles to reflect different use cases, accounts, and operating environments. The different profiles may then be compartmentalized, but may be switched between readily by a user of a device. Use of particular profiles in appropriate circumstances may bring about greater efficiencies and decrease user frustration, if it prevents a user from having to navigate through irrelevant materials, and allows the user to give focused attention to a particular activity. Thus, a mobile device may be configured by enabling a mobile device to access a first profile and a second profile for the mobile device. The first profile may include, for example, a work profile configured to perform work-related tasks and the second profile may include, for example, a commuter profile configured to provide traffic-related information during a challenging commute.

A user interface for switching between profiles may involve full manual interaction or automatically-triggered interaction followed by manual confirmation performed by a user. In the manual interaction, the user may determine that he or she would like to switch modes to have a new device profile, such as by selecting a choice in a menu, moving their device in a particular manner (e.g., shaking it vigorously), or in other manners. Such a user input may cause a list of available profiles to be displayed on the device, and the user may scroll up or down through the list, and then select one of the profiles, such as by scrolling with a mechanical scrollwheel on the device and clicking on the wheel, or scrolling by dragging a finger on a touchscreen and tapping the screen to select a profile.

Such an interface may be automatically triggered by a device recognizing that its context has changed, such as by recognizing when a user has switched from work to home operation. Such recognition may occur using GPS functionality, where the device may prompt a user to change to a work profile if it recognizes that the user is at or near a workplace. Similarly, the device may prompt a user to switch to a navigation profile when it senses that it is moving at or above a certain speed such as 30 miles per hour. The recognition may also occur by identifying a wireless network through which the device is communicating—e.g., a workplace network or a home router. In addition, the recognition may simply be time-based, so that a user is prompted to switch to a work-centered profile during working hours on weekdays, and a personal profile during other times.

FIG. 1A illustrates a mobile device 100 with an example of a display that enables a user to select a profile that is different than the device's current profile. The display on device 100 includes a message to the user with profile John_Doe_Work (which may be a predetermined name for a profile), that the user no longer appears to be working in the office. The mobile device may include an internal navigation system (e.g., a Global Positioning System (GPS)) and have the location of the user's work environment configured so that it can identify when the user is located within "work boundaries." Upon detecting that the user has left the geographic boundaries, the mobile device 100 may generate the display to enable the user to invoke a commuter profile entitled John_Doe_Commute. The display illustrates that the user should touch the highlighted region in order to switch to the identified profile.

Figure 1B:
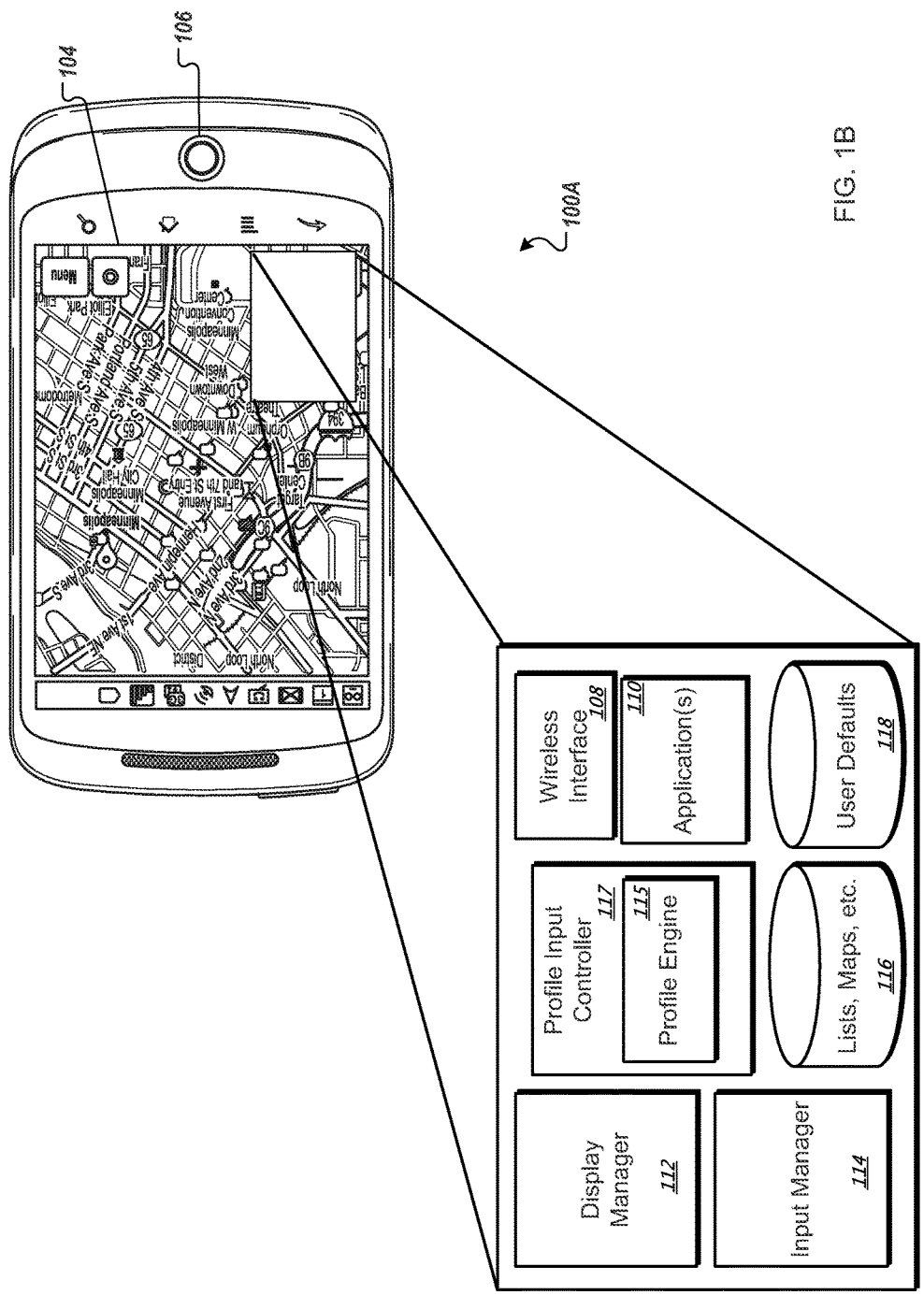
FIG. 1B illustrates a mobile device with a block diagram of internal components.

FIG. 1B illustrates a mobile device 102 with a block diagram of internal components that enable the operation of profile switching in manners like those discussed above and below. In particular, FIG. 1B is a schematic diagram of a system 100A that provides user interaction in response to touch screen inputs. The system 100A may be implemented using a mobile device such as device 102. The device 102 includes various input and output mechanisms such as a touch screen display 104 and a roller ball 106. A number of components within device 102 may be configured to provide various selection functionalities on display 104, such as by the drawing of one or more profiles on the display 104.

One such component is a display manager 112, which may be responsible for rendering content for presentation on display 104. The display manager 112 may receive graphic-related content from a number of sources and may determine how the content is to be provided to a user. For example, a number of different windows for various applications 110 on the device 104 may need to be displayed, and the display manager 112 may determine which to display, which to hide, and what to display or hide when there is overlap between various graphical objects. Also, when another component of the device 104 recognizes that a user is trying to select a different profile on a touchscreen display, the display manager 112 may help coordinate navigation and configuration of the profile on the display.

The display manager 112 can include various components to provide particular functionality for interacting with displayed components, which may be shared across multiple applications, and may be supplied, for example, by an operating system of device 102. Entry of profiles over other displayed components may be managed, in coordination by the display manager 112, using a profile input controller 117. Such a controller may be responsible for recognizing when a user is entering a profile rather than performing a different function on the display, and for providing the input profile into one or more commands that can be interpreted by other components on the device. To produce such commands, the profile input controller 117 may refer to a profile engine 115, by passing to the profile engine 115 information defining the profile that was entered by a user. The profile engine 115 may then compare the entered profile to both standard and custom profiles that are stored on the device, and return the identity of the profile, such as a label for an online account (e.g., a login or account name). For example, the profile engine 115 may return parameter values that define a plurality of different parameters for user interaction by the device 102, where the parameters span across multiple applications, and may, in certain implementations, control what applications are displayed on a main screen of the device 102.

The profile input controller 117 may have previously mapped and stored the parameters to be set and actions that are to occur when a particular profile is selected and/or created. As a result, the controller 117 may pass such information to other components of the device. For example, various applications 110 may be stored on and run on the device. Where, for example, the profile input controller 117 represents a profile that has been correlated to a contact record, the profile input controller 117 may call the contact application and pass it the identity of the record so that the record will be displayed automatically in response to a user's entry of the profile. For example, the contact application is configured to reflect contact information for associated contacts. In this manner, the profile input controller 117 can act as a form of intervener between core components of the operating system, and with applications on the device.

An input manager 114 may be responsible for translating commands provided by a user of device 102. For example, such commands may come from a keyboard, from touch screen display 104, from trackball 106, or from other such sources, including dedicated buttons or soft buttons (e.g., buttons whose functions may change over time, and whose functions may be displayed on areas of display 104 that are adjacent to the particular buttons). The input manager 114 may determine, for example, in what area of the display that commands are being received, and thus in what application being shown on the display the commands are intended for. In addition, it may interpret input motions on the touch screen 104 into a common format and pass those interpreted motions (e.g., short press, long press, flicks, and straight-line drags) to the appropriate application. The input manager 114 may also report such inputs to an event manager (not shown) that in turn reports them to the appropriate modules or applications.

The profile input controller 117 may register with the input manager 114 so as to be informed about user inputs on the touchscreen, and may in turn inform the input manager when it has recognized a particular input as being a entered, so as to prevent the input manager from passing the input to other components that may interpret it inaccurately as being something else.

A variety of applications 110 may operate, generally on a common microprocessor, on the device 102. The applications 110 may take a variety of forms, such as mapping applications, e-mail and other messaging applications, web browser applications, music and video players, and various applications running within a web browser or running extensions of a web browser. The applications 110 may include applications that store records or other components having alphanumeric names, and that can thus be accessed quickly by a user of the device 102. Different applications may be launched by a user by selecting icons for particular ones of the applications. The icons that are shown on the display 104 may change based on the current profile that is set for the device 102.

A wireless interface 108 manages communication with a wireless network, which may be a data network that also carries voice communications. The wireless interface 108 may operate in a familiar manner, such as according to the examples discussed below, and may provide for communication by the device 102 with messaging services such as text messaging, e-mail, and telephone voice mail messaging. In addition, the wireless interface 108 may support downloads and uploads of content and computer code over a wireless network.

Various forms of persistent storage may be provided, such as using fixed disk drives and/or solid state memory devices. Two examples are shown here. First, storage 116 includes various definitions for objects that may be stored on and presented by the device 102. Such objects include lists of other objects, such as lists of songs, television shows, movies, or other media on the device. The lists may also include lists of file names where the device 102 stores a large number of files. Also, other objects such as maps may be stored (e.g., as graphical map tiles that can be pre-fetched from a remote server), and meta data about the maps, such as the names of towns and streets on a map, along with the names of points of interest and business on the maps. Each of the different files and/or applications may be associated with one or more profiles. For example, a first application may be associated with a work profile and a second application may be associated with a social profile (e.g., a game). Similarly, certain data may be identified as being associated with work use while other data is identified as being associated with social use.

Other storage includes user defaults 118, which may be configuration information for different user profiles stored on the same media as the lists, maps, etc. 116. The user defaults 118 include various parameters about a user of the device 102. In the example relevant here, the user profile may include data defining various custom profiles that the user has entered, along with objects or actions to be associated with the entry of those profiles. Profile data and other information may be stored in a variety of forms, such as in one or more XML files or in SQLite files.

Using the pictured components and others that are omitted here for clarity, the device 102 may provide particular actions in response to user inputs. Specifically, the device 102 may respond to inputs by a user by recognizing an input as being a profile shortcut, and for responding to such data entry by reconfiguring a device to a different setting, mode, location or object associated with a different profile.

Figure 2:
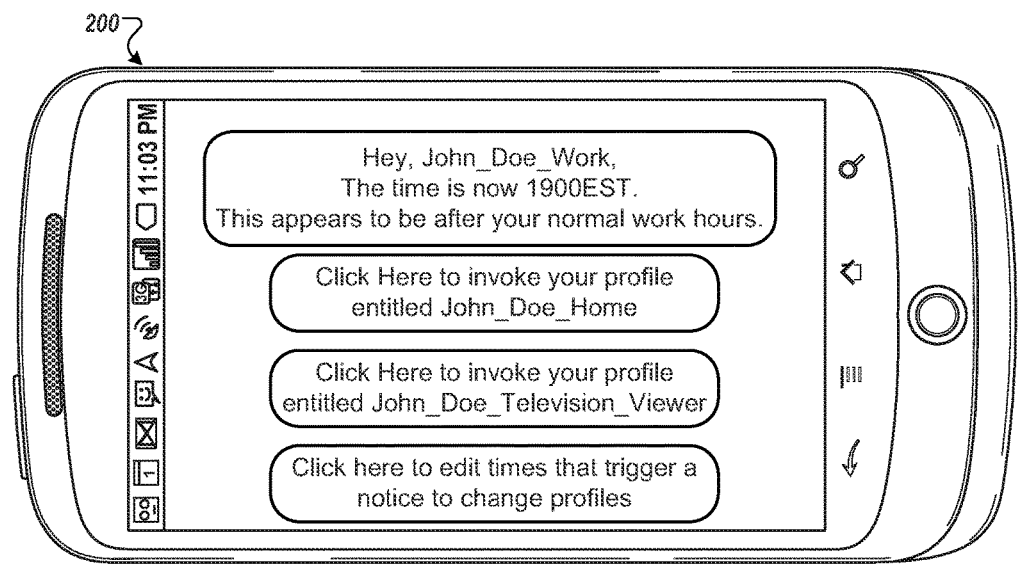
FIG. 2 illustrates a mobile device with an example of a display that enables a user to select a different profile based on a local time for the mobile device.

FIG. 2 illustrates a mobile device with an example of a display 200 that enables a user to select a different profile based on a local time for the mobile device. Display 200 includes a message to the user with profile John_Doe_Work that the user no longer appears to be working in the office by virtue of the local time being after normal working hours. The display may be generated automatically, without user intervention, at a particular predetermined time that has been set (either initially by the system, or manually by the user) as a time when the user typically changes from one mode to another. The mobile device may rely on an internal or network-based clock and have the location of the user's work environment configured to reflect a work profile during normal working hours. Display 200 enables the user to invoke a John_Doe_Home profile, a John_Doe_Television_Viewer profile, and edit times when different profiles are invoked.

Figure 3:
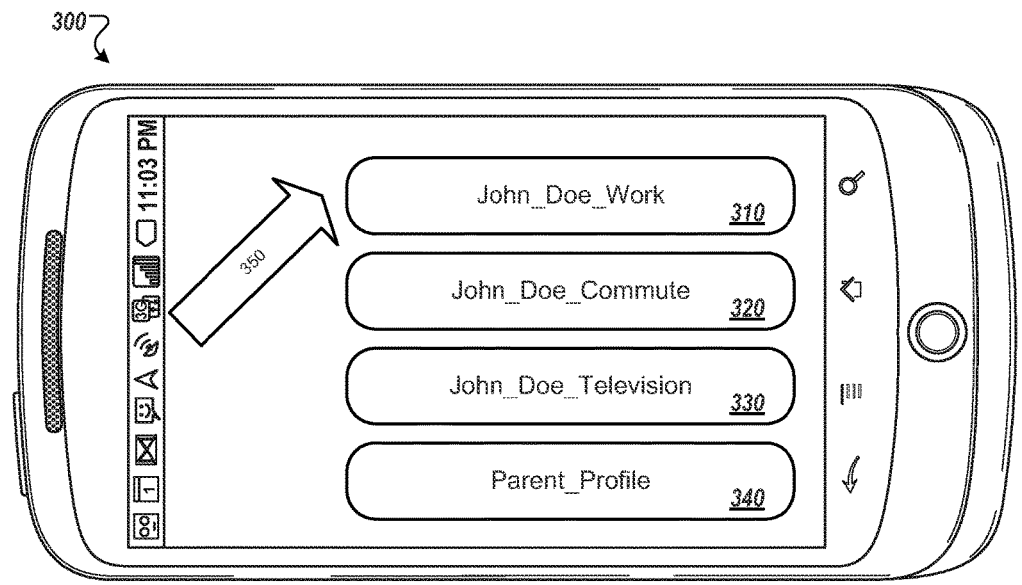
FIG. 3 illustrates a mobile device with an example of a display that enables a user to select a different profile using an in-display control.

FIG. 3 illustrates a mobile device 300 with an example of a display that enables a user to select a different profile using an in-display control. Specifically, display includes a soft "dial" control 350 that enables the user to invoke a work profile 310, a commute profile 320, an entertainment profile 330, and a parent profile 340. The control 350 may have been displayed in response to a manual user request to change profiles (e.g., by selecting an on-screen icon, pressing a physical button on the device 300, or moving the device 300 in a particular way), or in response to the device 300 automatically sensing a change in its context. In one configuration, the user touches control 350 and drags the tip of the arrow up or down to select different displays. The entertainment profile 330 may be configured to shows listings and other information related to current programming. For example, the mobile device may be used as a remote control for a set top box. The television profile may be configured to identify which television show is being watched, and present selectable links to retrieve additional information about the actors, advertisements, and/or products appearing in the television show. Thus, when the device is changed to the television profile, the remote control application may be made available, other applications may be made unavailable or decreased in prominence, and other parameters for the system across multiple applications may be changed. The parent profile 340 may include information that permits an adult to permit a young child to use the parent's mobile device. For example, a parent may permit their child to play a child's video game on the mobile device, while blocking the child from accessing the Internet.

Figure 4:
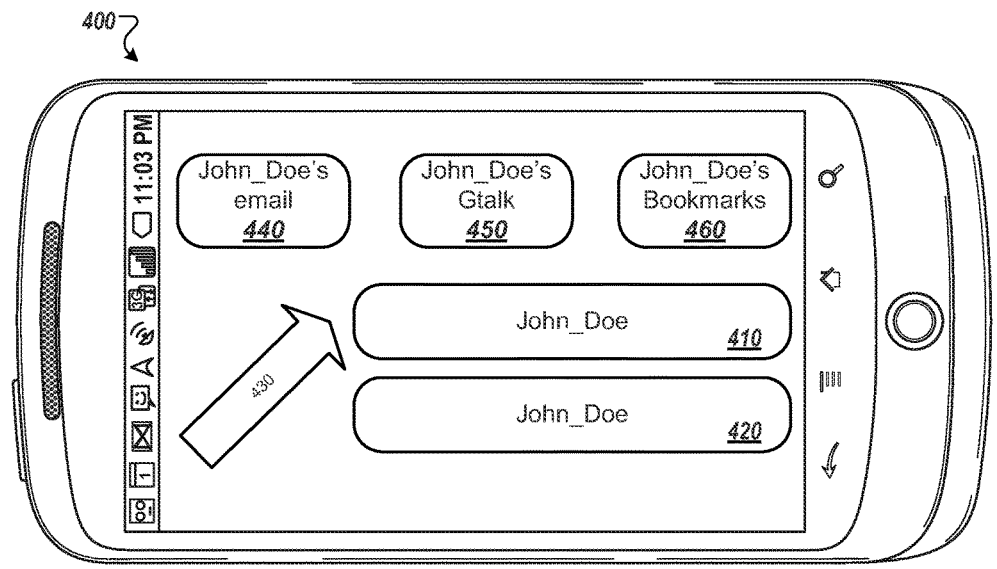
FIGS. 4 and 5 illustrate a mobile device with an example of a display that enables a user to select different profiles for different online identities.
Figure 5:
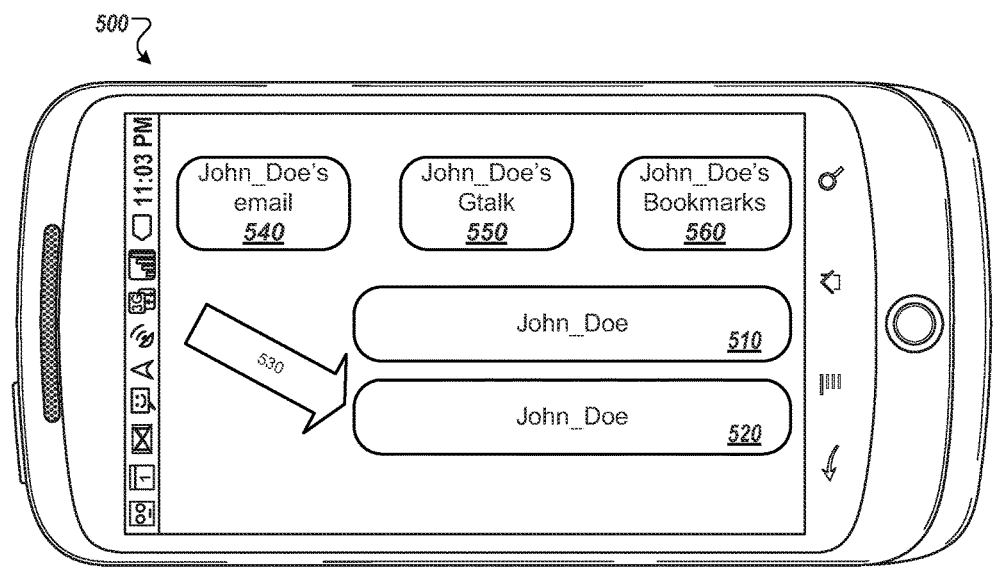

FIGS. 4 and 5 illustrate a mobile device 400, 500 with an example of a display that enables a user to select different profiles for different online identities. Display on device 400 illustrates that a first profile 410 labeled John_Doe has been selected using control 430 (in contrast to second profile 420 for Jane_Doe). As a result of selecting the first profile 410, the email icon 440, instant messaging icon 450, and the bookmark icon 460 have been modified to reflect John_Doe's profile. In contrast, the display of device 500 indicates that second profile 520 has been selected using control 530 (in contrast with first profile 510). With the second profile 520 selected, the email icon 540, instant messaging icon 550, and the bookmark icon 560 have been modified to reflect Jane_Doe's profile.

Thus, while previous displays have illustrated how different profiles may be associated with a single user identity, the displays of devices 500 and 600 illustrate how a single mobile device may be configured to support multiple user identities. In addition, authentication mechanisms may be used as a user switches from a first user's profile to a second user's profile. For example, the user may be prompted to enter a password or code to switch between information associated with a different user.

Figure 6:
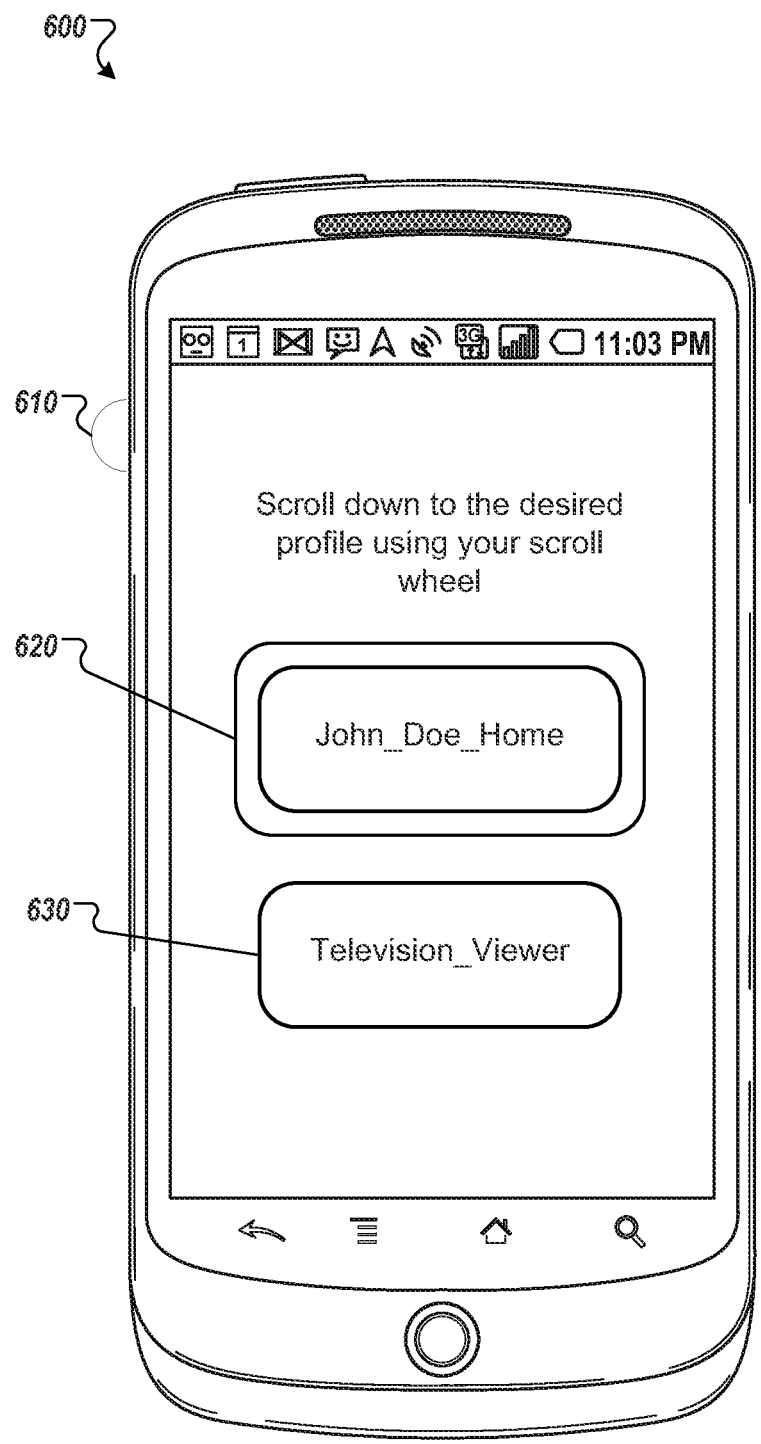
FIG. 6 illustrates a mobile device with an example of a display that enables a user to select use a mechanical wheel to select a different profile.

FIG. 6 illustrates a mobile device 600 with an example of a display that enables a user to select use a mechanical wheel to select a different profile. The display of device 600 illustrates how controls 620 and 630 are coupled conceptually to a track wheel 610. The user may use the track wheel 610 to switch from a first profile (highlighted as John_Doe_Home) to a second profile (shown as Television_Viewer). In addition to track wheel 610, a toggle switch, depressible control (e.g., a three position "see-saw" button, track ball, and/or dedicated button may be configured to switch between different profiles.

Figure 7:
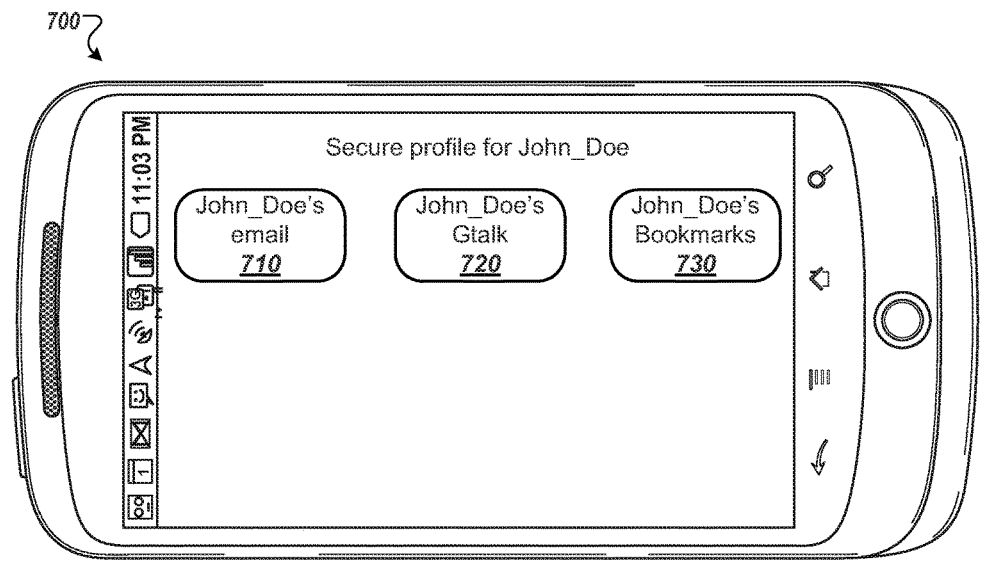
FIG. 7 illustrates a mobile device with an example of a display that reflects the use of a secure profile.

FIG. 7 illustrates a mobile device 700 with an example of a display that reflects the use of a secure profile. The display of device 700 illustrates that while each of the applications is customized to reflect access to account information for John_Doe, only the icon information for each application (e.g., email application 710, instant messaging application 720, and bookmarks 730). A user other than John_Doe perceiving the display may learn the identity of the user, but not perceive the content of messages sent to John_Doe.

Figure 8:
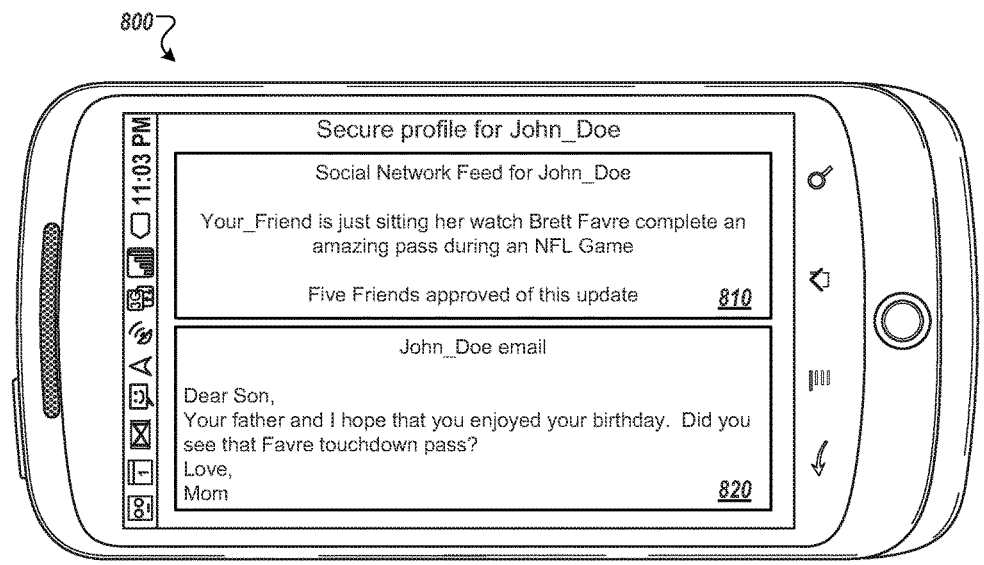
FIG. 8 illustrates a mobile device with an example of a display that reflects the use of a social profile.

In contrast to display on device 700, FIG. 8 illustrates a mobile device 800 with an example of a display that reflects the use of a social profile. The display on device 800 illustrates how selection of a social profile enables the mobile device to readily display excerpts of content. As shown, content 810 from a social network feed for the first user is surfaced into the display. As a result of configuring the mobile device with the social profile for John_Doe, the user is not required to launch an application in order to perceive the social network feed. Rather, the application is automatically activated in response to the change in profiles, and content 810 is readily perceivable alongside content 820 for an electronic mail messaging application.

Content 820 reflects a stream of currently received email. A user accessing the display on device 800 is not required to launch an electronic mail messaging application, or select an inbox (one of a user's multiple different email accounts may be selected automatically with the change in profiles) and select a newly-received message. Rather, a newly received message may be surfaced into a display page when a social profile is being used.

Figure 9:
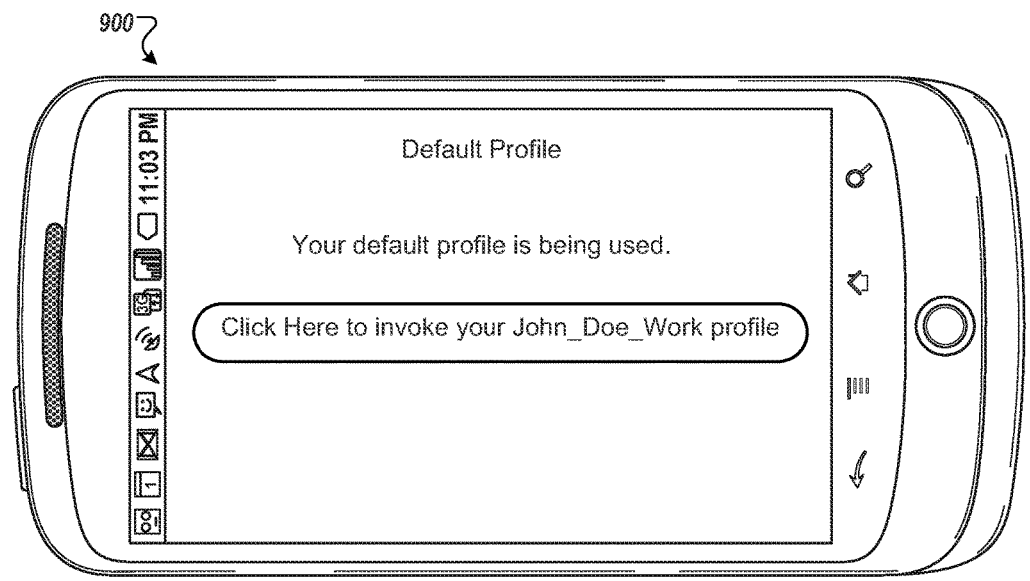
FIG. 9 illustrates a mobile device with an example of a display that reflects the use of a default profile.

FIG. 9 illustrates a mobile device 900 with an example of a display that reflects the use of a default profile. As shown in the display of device 900, the user has been asked to confirm that a default profile should be invoked. Typically, a default profile is a profile used to access applications believed to be applicable to a wider audience without concerns that an application within the default profile might be deemed too focused or oriented towards a specific demographic. The user may interact with the control shown in order to create a default profile. In one configuration, a default profile is a profile that is used if a device is stored. In another example, the default profile may be pushed to additional devices through a hosting service so that as a user accesses multiple platforms, a profile may be accessed on the different devices.

Figure 10:
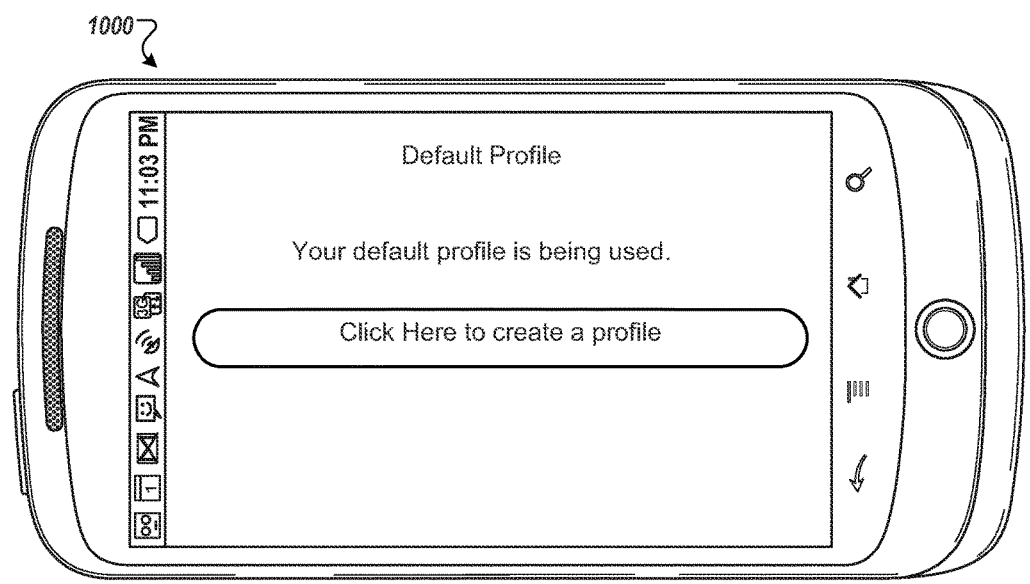
FIG. 10 illustrates a mobile device with an example of a display that reflects the use of a social profile.
Figure 11:
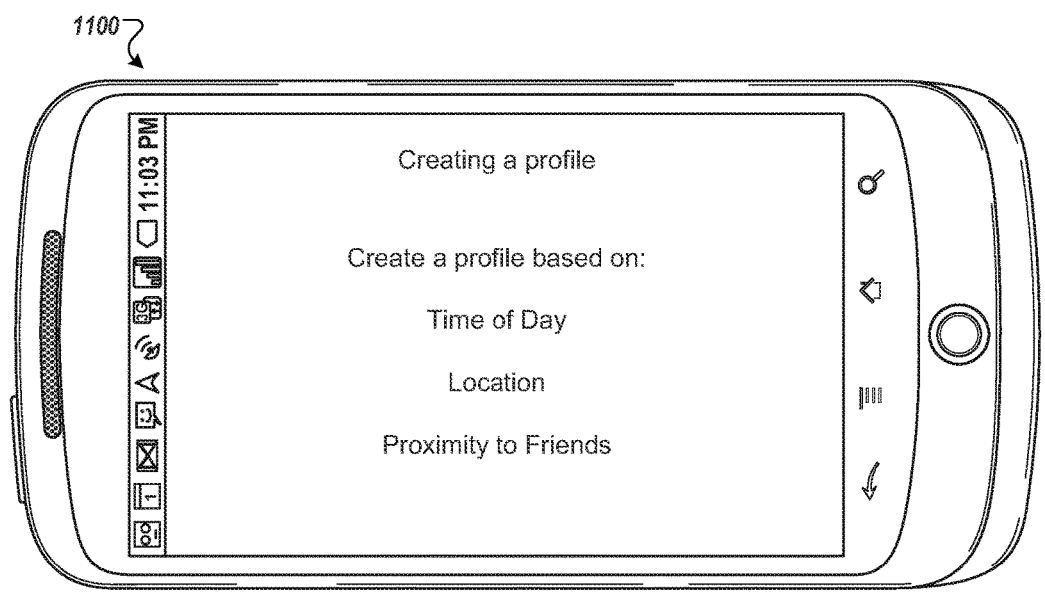
FIGS. 11-14 illustrate a mobile device with an example of a display that enables a user to create a profile.
Figure 12:
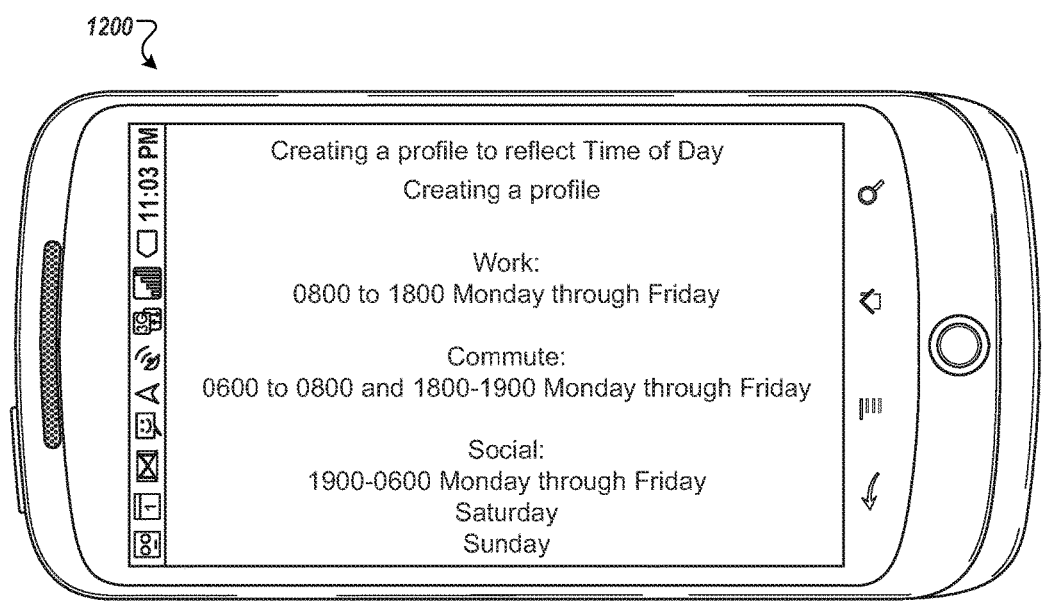
Figure 13:
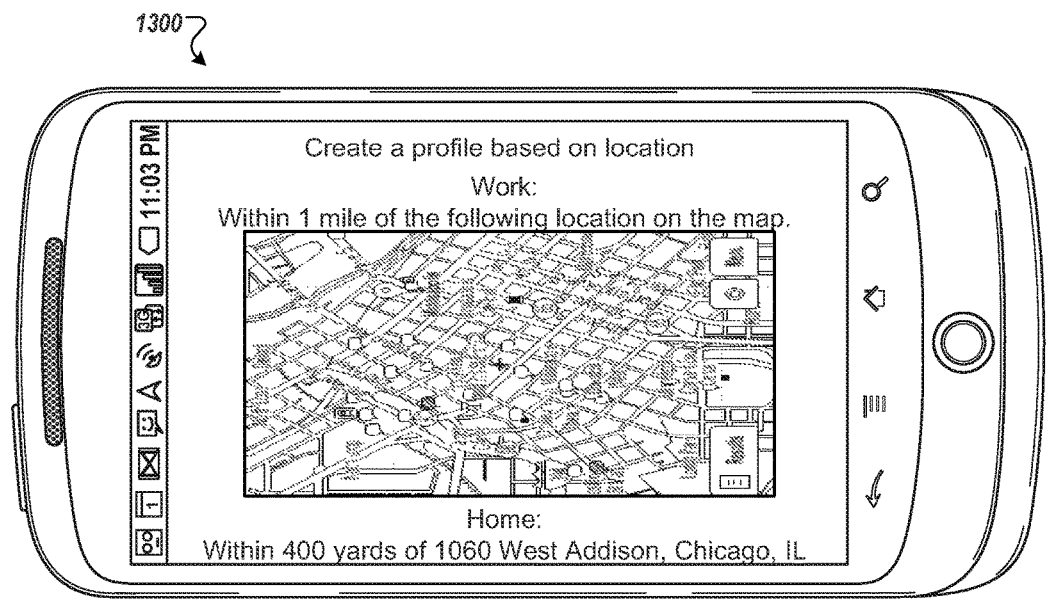
Figure 14:
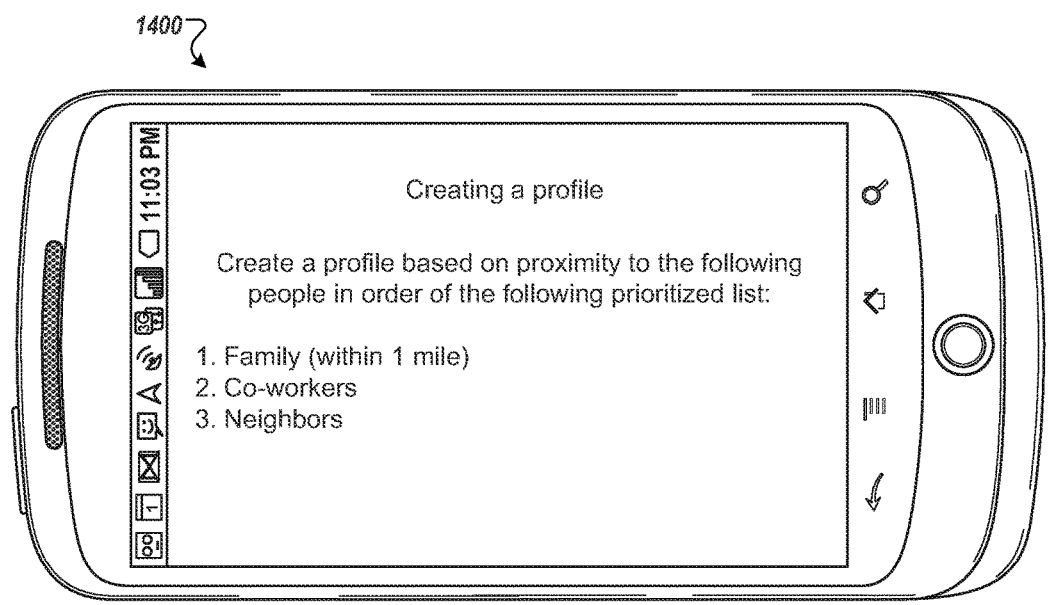
Figure 16:
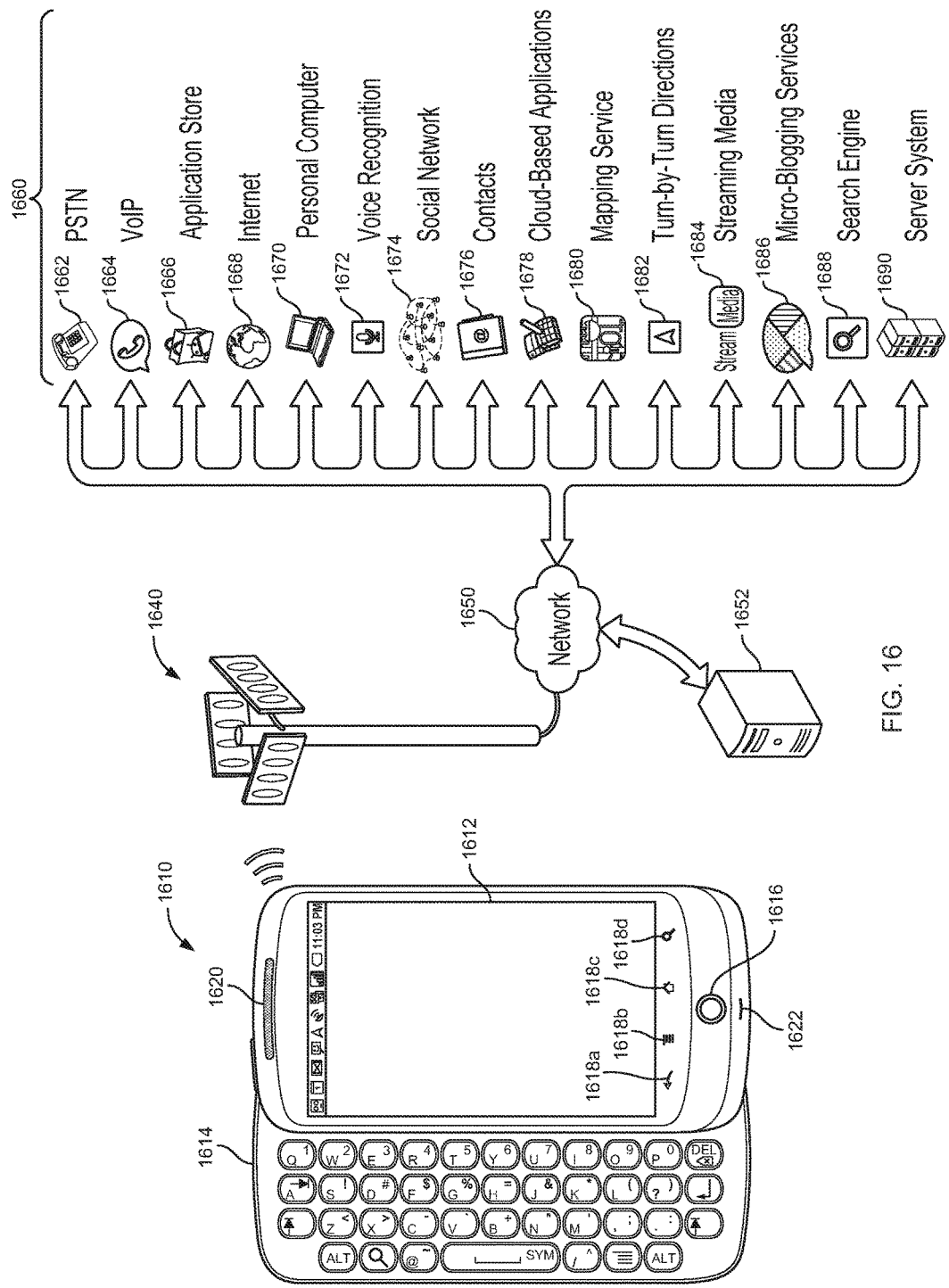
FIG. 16 is a conceptual diagram of a system that may be used to implement the techniques, systems, mechanisms, and methods described in this document.
Figure 17:
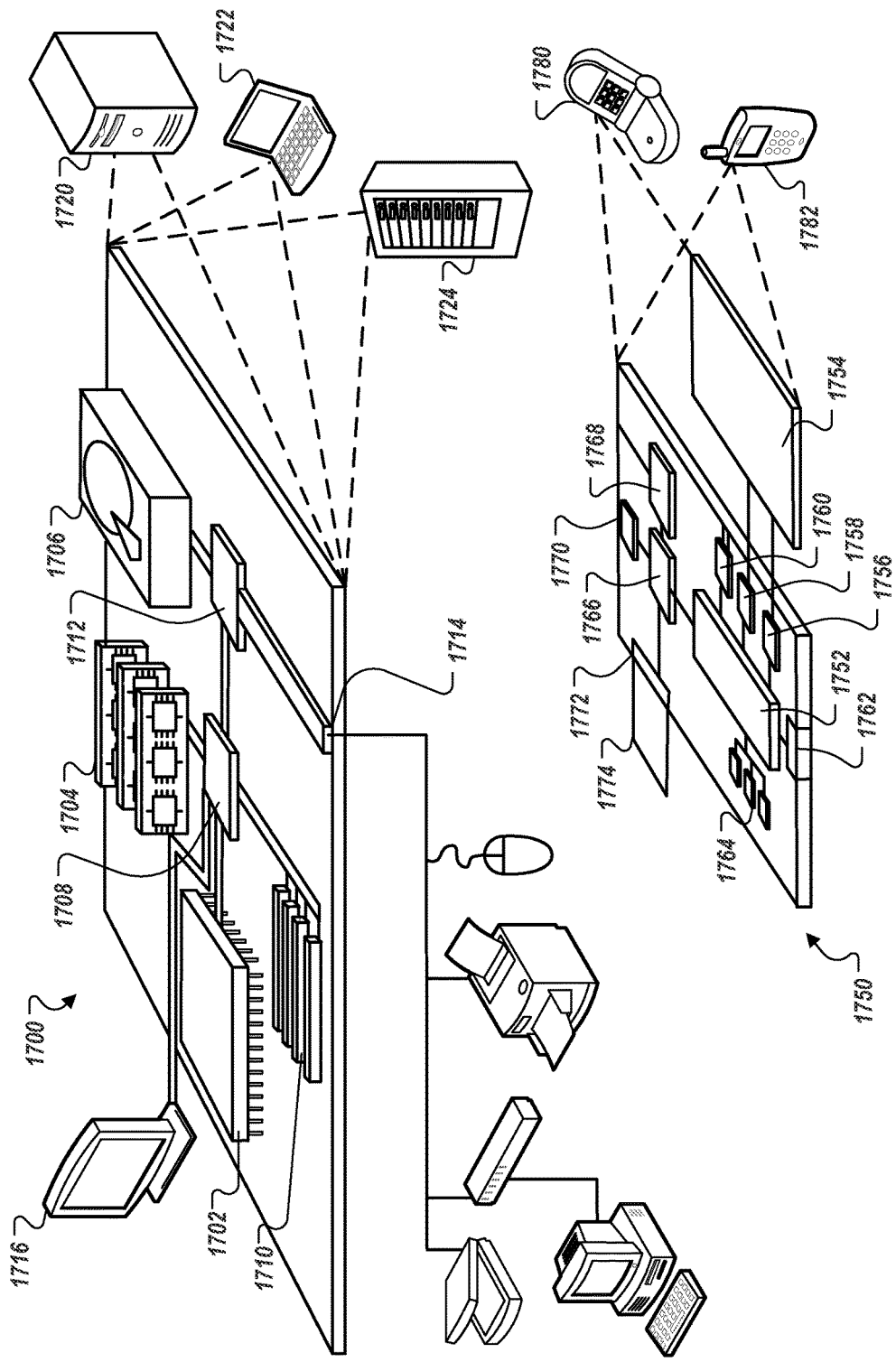
FIG. 17 is a block diagram of computing devices that may be used to implement the systems and methods described in this document, as either a client or as a server or plurality of servers.

FIG. 10 illustrates a mobile device 1000 with an example of a display that reflects the use of a social profile. A social profile may reflect useful tools used by a user when the user is in a social environment. For example, the social profile may include a reservation application, a movie show times application, a map application designed to identify proximate events, and an instant messaging application used to exchange instant messages and texts.

The social profile may differ from the default profile in the rules that are used to manage the device. For example, a user may desired to compartmentalize a work profile from a social profile so that work resources are not rendered or accessible during social hours and social resources are not rendered or accessible during work hours. A mobile device may analyze content received on the mobile device and determine that the content (e.g., a newly received message) is associated with a particular profile that is currently being filtered. The mobile device then may "hide" the content until such time as the profile changes to a suitable environment.

FIGS. 11-14 illustrate mobile devices with example displays that enable a user to create a profile. For example, as shown in a display of device 1100, a user may create a tool that may be used by time of day, location or proximity to friends. Thus, display 1100 may be used to specify that a work profile should be used during normal business hours and/or in those locations associated with a work environment. The user also may interface with display 1100 to specify that even though a work profile has been invoked, if a friend appearing in a list of contacts appears within 200 meters of the user (as established in known manners by a friend tracking service), then a friends profile may be invoked so that the user may interact with their friend using applications using, for example, applications appearing within the social profile. Similarly, a social profile may be surfaced when a user is responding to an email or text message from someone who is identified as a friend in a contacts list for the user, and the profile may stay in that state for a predetermined time (e.g., 5 minutes) after the user performs an action to be socially related, or until the user performs an action that is determined by the system to be business related, such as responding to a message sent by someone identified in the user's contacts as a co-worker.

The display on device 1200 illustrates that a work profile has been created for certain periods of time on certain days, a commuter profile has been created for commuter hours, and a social profile has been created for additional periods of time. The periods of time may be used in association with additional stimuli to better invoke a particular profile. For example, if the wireless device 1200 is moving at more than a threshold rate (e.g., 50 mph) during the specified period of time, then the wireless device may invoke a commuter profile. If the wireless device 1200 has determined that the user has not yet exceeded 10 mph, the wireless device 1200 may infer that the user has not yet begun a commute, and thus may stay in a setting other than the commuter profile. In contrast, if the wireless device 1200 has determined that it has already exceeded the specified speed and then stayed at a stationary location for more than a threshold period of time, the wireless device 1200 may determine that the commute has been completed, thereby ascertaining that the commuter profile no longer needs to be displayed.

The display on wireless device 1300 illustrates how a user may interface with a map application in order to create a profile. For example, and as shown, if the user is located within a threshold distance of a particular address or location (as specified by the user), then the user may configured the wireless device 1300 to invoke a home profile. The display also illustrates that a user may identify a path and a geographic region proximate to a work location as being associated with a work profile. If the wireless device 1300 determines that it is located within a threshold distance of the specified path, it can be configured to access a commuter profile (not shown). In one configuration, the user interfaces with a map by entering an address or specifying a starting point and a destination point. In another configuration, the user can specify a location by using a touch screen control or other form of control, such as a mouse or track pad, to identify a geographic location. The mapping application may be invoked through a profile creation application.

The display of wireless device 1400 illustrates how different profiles may be created based on user proximity to other users. As shown, a display on wireless device 1400 enables a user to create different profiles based on user proximity to a family member, a co-worker, and a neighbor. If a user of the device 1400 is proximate to a family member (as determined by the wireless device 1400), the device 1400 may be configured to present a photo album, a messaging application, and a link to launch a multiplayer game. If a user is proximate to a co-worker, the wireless device 1400 may be configured to display a link to access the monthly sales reports, a work email account, and a project management application. If a user is proximate to a neighbor, a wireless device may be configured to display a link to community news, weather, and a social networking application. Similarly, changes in a device profile may be triggered by identifying the presence of another user in non-geographic manners. As one example, when the device 1400 rings with an incoming call, the device 1400 may check a contacts list for a user to identify the caller and may set parameters in manners like those discussed for geographic proximity to another user, such as by pulling up business data specifically related to the caller, such as worker performance data when the caller is an employee of the same organization as the user of device 1400, or sales data for the caller or the caller's employer when the caller is a customer of the organization for which the user works.

In one configuration, a framework of suggested applications is provided by a service provider. That is, a service provider may provide a package of applications that are provided with each profile to ease the administrative burden of setting up different profiles. In response to launching a profile management application, the wireless device may retrieve a list of suggested profiles in addition to a package of applications that is launched for each profile. Also, application developers may identify a profile type in which their application should be surfaced, and the application may automatically be associated with that profile when it is installed, perhaps after receiving a manual confirmation from a user of the device 1400. The user may also be provided with an interface by which the user can drag applications from a list of applications onto icons or other user interface elements that represent particular profiles that have been set up on the device 1400.

FIG. 15 illustrates a flow chart of a process by which a mobile device is configured to reflect the use of a different profile. In particular, FIG. 15 is a flow chart 1500 of a process by which a mobile device is configured to use a second profile so that the user perceives the mobile device using a second configuration for the second profile that is separate and distinct from a first configuration associated with a first profile.

Initially, a user on a mobile device is enabled to access a first profile and a second profile for the mobile device (1510). For example, a mobile device may be configured to present user options to create a work profile and a home profile when the user activates a wireless device. The device may also be programmed with parameters for additional profiles to which the device may be switched, where each profile defines a manner in which the device interacts with a user. The profiles may also act at the operating system level, and thus a single change in profile can affect multiple distinct applications on the device. Certain profiles may also cause icons or other controls for launching or accessing certain types of applications to be exposed or elevated in visual prominence in an operating system, e.g., so that social networking applications can be more easily accessed when in a social mode, and so that financial applications can be more easily accessed when in a business mode. Also, the email account that is displayed in a messaging application may automatically change when profiles are changed (e.g., from an account at the user's employer's domain to an account at a public domain, and vice-versa).

The mobile device receives an instruction to load the first profile to the mobile device (1520), and the device then operates using that profile. Loading the first profile to the mobile device may include a user specifying that a default profile should be used unless otherwise specified. Thus, as a mobile device monitors for triggering criteria, the mobile device is configured to maintain the mobile device in a first profile (e.g., a default profile).

The mobile device is configured to use the first profile so that a user perceives the mobile device using a first configuration (1530). The first configuration may include a display management setting so that certain applications are readily available on a home display while other applications are displayed with less prominence and/or disabled while the first setting has been invoked. The first configuration may include limitations on who may be contacted, how others may be contacted, and/or controls that limit the information that may be exchanged with others (e.g., use of sensitive corporate internal labels may be prohibited).

The mobile device then presents to the user on the mobile device a selectable control structured and arranged to enable the user to switch from the first profile to the second profile (1540). The presentation may be triggered automatically by the device recognizing that it has changed states, such as by using GPS to sense that it has moved to a new location (e.g., into the user's workplace or out of the workplace), that it is moving above or below a particular speed, or that the time has changed (e.g., into work hours or out of work hours). Presenting a selectable control may include presenting the selectable control shown in FIG. 3. The selection presented to the user may be in a list of a plurality of alternative profiles the user may switch to, and the suggested profiles may be sorted by the device based on a determined likelihood that the user will want to switch to them. Alternatively or in addition, a user may be prompted with information describing why the mobile device has determined that a transition is in order. For example, a mobile device may display a message that reads, "it appears that you are no longer in the office. Would you like to switch to a social profile?"

The mobile device receives, from the user, an instruction to switch from the first profile to the second profile (1550). Examples of the instruction include receiving a user selection to toggle a profile setting from a first setting to a second setting. The user may acknowledge a message from the mobile device that it appears that a transition from a first profile to a second profile is proper. The user then may signal their agreement by using a touch screen control to select the prompt or specify changes to the proposed instruction (e.g., use a social profile for a child instead of a parent).

The mobile device is then configured using the second profile so that the user perceives the mobile device using a second configuration for the second profile that is separate and distinct from the first configuration associated with the first profile (1560). Thus, a user may be presented with a social profile on their mobile device instead of their work profile.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of configurations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other configurations and operations are within the scope of the following claims.

What is claimed is:

1. A method of configuring a mobile device, the method comprising:
    providing, for a mobile computing device, a plurality of device profiles that each define a manner in which the mobile computing device interacts with one or more users, the plurality of device profiles including:
        (i) a first profile that causes presentation of a first user interface including a first set of applications, and
        (ii) a second profile that causes presentation of a second user interface including a second set of applications, wherein the second profile is separate and distinct from the first profile,
            wherein the second set of applications is different from the first set of applications;
    operating the mobile computing device using the first profile of the plurality of device profiles so as to cause the mobile computing device to present the first user interface that includes the first set of applications;
    automatically, without user input, identifying by the mobile computing device that the mobile computing device has changed states as a result of the mobile computing device changing from a first geographic location that is associated with a first state to a second geographic location that is associated with a second state;
    in response to automatically identifying that the mobile computing device has changed states as a result of the mobile computing device changing from the first geographic location to the second geographic location, presenting a list of one or more of the device profiles that are available to the mobile computing device and a selectable control for selecting one of the one or more profiles in the list, the list of one or more of the device profiles including the second profile;
    receiving, from a user, an instruction to switch to the second profile of the device profiles in the list that is separate and distinct from the first profile;
    challenging the user for authentication information as a result of receiving the instruction to switch from the first profile to the second profile; and
    configuring the mobile computing device, in response to having received the instruction to switch to the second profile and in response to the user providing correct authentication information, to operate according to the second profile so as to cause the mobile computing device to present the second user interface that includes the second set of applications.

2. The method of claim 1, wherein presenting the selectable control includes displaying a highlight on the second profile in the list, the highlight being movable through the list for the user to select other profiles in the list.

3. The method of claim 1, wherein presenting the selectable control includes enabling the user to select a mechanical control that is outside of a display in the mobile computing device to switch between the first profile and the second profile.

4. The method of claim 1, wherein operating the mobile computing device using the first profile includes configuring the mobile computing device to use a default profile as the first profile in response to performing a power up sequence on the mobile computing device, wherein the default profile does not reflect any personalization for the user, or at least some user preferences but fewer user preferences than are displayed using the second profile.

5. The method of claim 1, wherein receiving the instruction to switch to the second profile includes receiving user input that interacts with the presented list of one or more of the device profiles to cause the mobile computing device to switch from the first profile to the second profile, the list of one or more of the device profiles being presented automatically as a result of identifying that the mobile computing device has switched states.

6. The method of claim 1, wherein configuring the mobile computing device to operate according to the second profile includes making available to the user different applications than are made available with the first profile.

7. The method of claim 1, further comprising:
detecting a current time for the mobile computing device;
determining that the current time for the mobile computing device is associated with the second profile; and
presenting the selectable control in response to determining that the local time indicates that the selectable control should be presented in order to use the second profile.

8. One or more non-transitory recordable media having recorded thereon instructions that, when executed, perform operations comprising:
providing, for a mobile computing device, a plurality of device profiles that each define a manner in which the mobile computing device interacts with one or more users, the plurality of device profiles including:
(i) a first profile that causes presentation of a first user interface including a first set of applications, and
(ii) a second profile that causes presentation of a second user interface including a second set of applications, wherein the second profile is separate and distinct from the first profile,
wherein the second set of applications is different from the first set of applications;
operating the mobile computing device using the first profile of the plurality of device profiles so as to cause the mobile computing device to present the first user interface that includes the first set of applications;
automatically, without user input, identifying by the mobile computing device that the mobile computing device has changed states as a result of the mobile computing device changing from a first geographic location that is associated with a first state to a second geographic location that is associated with a second state;
in response to automatically identifying that the mobile computing device has changed states as a result of the mobile computing device changing from the first geographic location to the second geographic location, presenting a list of one or more of the device profiles that are available to the mobile computing device and a selectable control for selecting one of the one or more profiles in the list, the list of one or more of the device profiles including the second profile;
receiving, from a user, an instruction to switch to the second profile of the device profiles in the list that is separate and distinct from the first profile;
challenging the user for authentication information as a result of receiving the instruction to switch from the first profile to the second profile; and
configuring the mobile computing device, in response to having received the instruction to switch to the second profile and in response to the user providing correct authentication information, to operate according to the second profile so as to cause the mobile computing device to present the second user interface that includes the second set of applications.

9. The non-transitory recordable media of claim 8, wherein the first profile is associated with a first email account for the user that is different than a second email account that is associated with the second profile.

10. The non-transitory recordable media of claim 8, wherein presenting the selectable control includes displaying a highlight on the second profile in the list, the movable highlight being scrollable through the list for the user to select other profiles in the list.

11. The non-transitory recordable media of claim 8, wherein configuring the mobile computing device to operate according to the second profile includes making available to the user different applications than are made available with the first profile.

12. The non-transitory recordable media of claim 8, wherein the operations further comprise:
detecting a current time for the mobile computing device;
determining that the current time for the mobile computing device is associated with the second profile; and
presenting the selectable control in response to determining that the local time indicates that the selectable control should be presented in order to use the second profile.

13. The method of claim 1, wherein automatically identifying that the mobile computing device has changed states includes identifying that an individual in a list of contacts has appeared within a threshold distance of the mobile computing device.

14. The method of claim 1, wherein automatically identifying that the mobile computing device has changed states includes identifying that that the mobile computing device is moving at more than a threshold rate of speed.

15. The method of claim 1, wherein automatically identifying that the mobile computing device has changed states includes identifying that the mobile computing device exceeded a threshold rate of speed and then remained stationary for more than a threshold period of time.

16. The method of claim 1, wherein automatically identifying that the mobile computing device has changed states includes identifying that the mobile computing device is within a threshold distance of a path that is between geographical locations and that was specified by user input at the mobile computing device.

17. The method of claim 1, wherein configuring the mobile computing device to operate according to the second profile includes elevating in visual prominence, to a home display of the mobile computing device, an icon to launch a particular application program.

18. The method of claim 1, wherein configuring the mobile computing device to operate according to the second profile includes automatically activating an application program without receipt of user input.

19. The method of claim 1, wherein configuring the mobile computing device to operate according to the second profile includes automatically changing an email account that is displayed in a messaging application, without receipt of user input, by switching from a first email account for a first domain to a second email account for a second domain.

* * * * *